3,272,749
DRILLING MUD AND ADDITIVE THEREFOR
Robert A. Martin, Charleston, W. Va., assignor to Alco Chemical Corporation, Philadelphia, Pa., a corporation of Ohio
No Drawing. Filed Mar. 31, 1965, Ser. No. 444,433
11 Claims. (Cl. 252—8.5)

This application is a continuation-in-part of application Serial No. 102,944, filed April 14, 1961, now abandoned.

This invention relates to improved drilling fluids, in particular to drilling fluids comprising aqueous mud or clay dispersions which have low water loss and improved heat stability, and to novel additives useful for providing drilling fluids with such properties.

When drilling an oil well with rotary drilling tools, it is a common practice to circulate a fluid down the drilling shaft and up through the annular space between the drill hole and the drilling shaft. This drilling fluid, or aqueous drilling mud performs at least three functions. It cools and lubricates the drill stem and drill bit; it carries the cuttings to the surface, where they can be removed, and it forms a thin filter cake on the wall of the well to minimize the loss of water into porous formations through which the well passes.

It is desirable for this fluid to form a weak gel on standing to prevent the cuttings from settling to the bottom of the hole should the operation be stopped for any reason. This gel structure should revert to a fluid state readily upon resumption of the pumping operation.

Many of these drilling fluids comprise an aqueous suspension of bentonite clays and a certain amount of solids derived from the well itself. The drilling fluids also contain other additives to alter such properties as viscosity, density, thixotropy, and water loss.

Many of the additives used in the past to reduce water loss are unstable at high temperatures, and in drilling deep wells where high temperatures are encountered must be added continually to the drilling fluid to minimize fluid loss. This requires the constant attention of a mud engineer to make the necessary additions to the drilling fluid.

As time goes on, more and more wells will be drilled to even deeper levels where high temperatures will be encountered. Thus, the need for providing relatively heat-stable fluid loss control agents will become even greater.

A principal object of this invention is to provide a drilling fluid having a reduced water loss and the proper viscosity and gel strength, and which maintains these properties even when exposed to high temperatures such as are encountered at the bottom of deep wells.

Another primary object of this invention is to provide a novel drilling fluid additive which can be readily incorporated into a drilling fluid to provide such a drilling fluid with low water loss, proper gel strength and viscosity at high temperatures.

A further object of the invention is to provide an improved method of drilling oil wells, gas wells and other deep wells.

Still another object of this invention is to provide an improved process for the treatment of drilling fluids in order to reduce water loss of said fluids, even at greatly elevated temperatures.

Furter objects, advantages and features of the invention will become apparent from a consideration of this specification and appended claims.

According to the present invention there is provided an improved aqueous drilling fluid comprising water, particulate solid material which forms a filter cake on the wall of a well, and a water-soluble polymer comprising vinyl alcohol units of the formula:

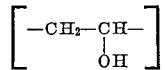

and recurring units of the formula:

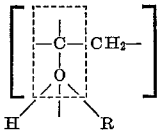

in which R is a radical having the formula:

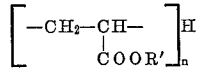

wherein R' is Na, K, Li, $NH_4$, $R''NH_3$, $R''_2NH_2$, $R''_3NH$ and $R''_4N$ and R'' is an alkyl group containing from 1 to 4 carbon atoms and $n$ is a positive integer from 25 to 1200, the ratio of the number of vinyl alcohol groups to the number of groups of Formula II being in the range between about 30:1 to about 200:1, and the total number of vinyl alcohol groups being in the range between about 800 and about 20,000, said polymer being present in an amount sufficient to reduce water loss through said filter cake without increasing the viscosity of said drilling fluid to prevent circulation thereof.

Advantageously, oil wells, gas wells and other deep wells where high temperatures are ordinarily encountered can be drilled employing the improved drilling fluids of this invention with a minimum of water loss. The novel water-soluble polymers of this invention are relatively stable at elevated well temperatures and their use in drilling fluids thus obviates one of major drawbacks of prior known water-loss reduction agents, namely their heat instability.

The branched water-soluble polymers employed in this invention may be prepared by introduction of free radicals into polymers of vinyl alcohol, reaction of these free radicals with an amide, nitrile or esters of acrylic acid to form a plurality of side chains comprising the respective acrylic group or groups, followed by hydrolysis of the side chain groups to convert them into side chains comprising salts of acrylic or polyacrylic acid.

The free radicals may be introduced into the molecules of polyvinyl alcohol in many ways, e.g. by reaction of polyvinyl alcohol with peroxygen compounds, such as, benzoyl peroxide or potassium persulfate, by irradiation of polyvinyl alcohol with ultra violet rays or gamma rays, or by ultrasonic vibration.

A very convenient and preferred method for introducing free radicals into polyvinyl alcohol is by reaction of an aqueous solution of polyvinyl alcohol with water-soluble ceric salts, such as, ceric ammonium nitrate or ceric ammonium sulfate.

The free radicals so produced then are allowed to react with unsaturated olefinic materials comprising acrylamide, acrylonitrile, and alkyl esters of acrylic acid such as the methyl and ethyl esters of acrylic acid. If the acrylic monomers are present during the reaction involving the use of water-soluble ceric salts, the acrylic polymeric side chains begin to form immediately.

It has not been determined whether the acrylic side chains are linked directly to the carbon atoms of the vinyl alcohol chain or through the oxygen atom. Therefore, in the specification and claims, the radical R in Formula II is shown as being attached to the

group, either through the oxygen atom or to the carbon atom. A hydrogen atom occupies a position not taken by radical R, and the other bond is a carbon to carbon bond to form a chain with vinyl alcohol groups of Formula I.

The acrylic side chains, which are generally polymeric, so produced can be hydrolyzed to salts by reaction with alkali metal hydroxides, such as sodium, potassium or lithium hydroxide, or by reaction with ammonium hydroxide; N-mono alkyl ammonium hydroxides, such as monomethyl-, monoethyl-, monopropyl- or monobutyl-ammonium hydroxides; N,N-dialkyl ammonium hydroxides such as N,N-dimethyl ammonium hydroxide; N,N,N-trialkyl ammonium hydroxides such as N,N,N-triethyl ammonium hydroxide, or N,N,N,N-tetraalkylammonium hydroxides such as N,N,N,N-tetrabutyl ammonium hydroxide.

As stated above in the highly branched water-soluble polymers employed in this invention the side chains may comprise from 25 to 1200 units of Formula III, 100 to 300 units being preferred. The ratio of vinyl alcohol units of Formula I to groups of Formula II may vary from about 30:1 to 200:1, a ratio in the range of 100:1 to 200:1 being preferred.

The length of the side chains and the ratio of vinyl alcohol groups of Formula I to groups of Formula II may be varied as desired by varying the amount of acrylic monomer used in forming the polymers as well as reaction condition as illustrated in the following example.

Any of the drilling muds now in use may be treated to advantage with the polymers of the invention. The muds may be made up with highly bentonitic clays such as the well-known Rogers Lake mud from California, with "P-95" clay which is a high-yield, high density clay used in deep-hole drilling, or with low-yield clays such as are obtained from the drilling formation itself and are typified by those obtained from the Ventura field in California. Muds containing Attapulgus clay are frequently used in drilling through salt-containing formations, and may be treated to advantage with the polymers of the invention. The polymers may also be used in emulsion-type muds wherein a hydrocarbon such as crude oil is emulsified in an aqueous clay suspension, usually in quantities on the order of 10% to 40% on the weight of the mud.

The quantities of the polymers of the invention that are incorporated into the above and other drilling fluids are usually within the range of about 0.1 to about 4–5 pounds per barrel (42 gallons) of drilling mud, although in exceptional cases quantities as high as 8 pounds per barrel may be added. The quantity of polymer added, however, should not increase the viscosity of the drilling fluid to such a degree that the drilling fluid cannot be circulated through the well. For most purposes quantities on the order of about 0.2–2 pounds per barrel are used. These reagents may be used alone, but other known mud-conditioning materials such as quebracho and sodium hydroxide are also usually incorporated into the mud. Other known conditioning agents which may be employed in conjunction with the polymers of the invention are alkali metal polyphosphates such as tetrasodium pyrophosphate, sodium tetraphosphate, sodium hexametaphosphate and the like, nigrosine, pectate pulp and other wall-building reagents, and other supplemental water loss-controlling reagents if desired.

The invention will be further illustrated by the following specific examples which describe the preparation of representative water-soluble polymers and the results of tests of these polymers in representative drilling mud. It should be understood, however, that while these examples may describe certain preferred embodiments of the invention they are given primarily for purposes of illustration, and that variations and substitution of equivalents may be resorted to within the scope of the appended claims.

In the several examples, drilling fluids containing the highly branched water-soluble polymers of this invention were tested with standard drilling fluid laboratory equipment and in accordance with the standardized procedure set forth in A.P.I. Code 29. The viscosity measurements were made with a Brookfield Viscometer, Model RVT using spindle #1 at 20 r.p.m. The mixing of the samples was for a period of 30 minutes in each case employing a Hamilton Beach high speed mixer. The water losses were determined with a Baroid filter press with a pressure of 100 pounds per square inch gauge applied for 30 minutes. All tests were done at room temperature. All barrels were 42 U.S. gallon barrels. The water losses were determined before and after the samples were heated for 16 hours at 350° F.

350 g. of a control drilling fluid containing dissolved or dispersed therein 50 g. of Martin Clay, 1.5 g. of quebracho and 0.75 g. of sodium hydroxide, but not containing any water-soluble polymer of the invention, was prepared and tested as above. The fluid loss was 48 ml. and after heating was 23 ml., and the viscosity was 6 centipoises, both before and after heating (aging).

EXAMPLE I

A solution of 10 g. of a high molecular weight (D.P. 16,800), completely hydrolyzed polyvinyl alcohol and 25 g. of methyl acrylate in 940 ml. of water is purged with nitrogen for 30 minutes. This solution is heated to 60° C. Then 25 ml. of water containing dissolved therein 1.37 g. of ceric ammonium nitrate and 1.10 g. of nitric acid is added. The mixture is stirred for 2½ hours at 60° C. Then the mixture is cooled to room temperature and neutralized to about pH 7.5 by the addition of 10 g. of 10% sodium hydroxide. There is obtained a yield of 32.5 g. of a polymer of vinyl alcohol containing attached thereto, at intervals of about 91 vinyl alcohol units, side chains of poly(methylacrylate) about 105 units long.

To the reaction mixture is added a solution of 10.5 g. of sodium hydroxide pellets in 15 ml. of water. The resulting mixture is heated for 50 hours at about 105° C. under a slight pressure of nitrogen. The excess sodium hydroxide is neutralized to a pH of 7.1 by the addition of 4.4 ml. of 5.0 N sulfuric acid. The product is a solution having at a concentration of 4.1% a viscosity of 650 cps. as measured by a Brookfield Viscometer, Model RVT.

Twenty-eight grams of a 5% solution of this product was added to 350 g. of a drilling fluid containing dissolved or dispersed therein 50 g. of Martin Clay, 1.5 g. of quebracho and 0.75 g. of sodium hydroxide. The fluid loss and viscosity of this mixture before and after being heated for 16 hours at 350° F. are shown in Table I.

EXAMPLE II

A solution of 10 g. of a high molecular weight (D.P. 16,800) completely hydrolyzed polyvinyl alcohol and 75 g. of methyl acrylate in 877.5 ml. of water is purged with nitrogen for 30 minutes. This solution is heated to 70° C. Then 62.5 ml. of water containing dissolved therein 3.43 g. of ceric ammonium nitrate and 2.76 g. of nitric acid is added. The mixture is stirred for 2½ hours at 70° C. Then the mixture is cooled to room temperature and neutralized to about pH 7.5 by the addition of 30 ml. of 10% sodium hydroxide. There is obtained a yield of 72 g. of a polymer of vinyl alcohol containing attached thereto, at intervals of about 36 vinyl alcohol units, side chains of poly(methyl acrylate) about 115 units long.

To the reaction mixture is added 32.1 g. of sodium hydroxide pellets in 35 ml. of water. The resulting mixture is heated for 18½ hours at about 105° C. under a slight pressure of nitrogen. The excess sodium hydroxide is neutralized to a pH of 8.5 by the addition of 4.0 ml. of 5.0 N sulfuric acid. The product is a solution having at a concentration of 5.0% a viscosity of 26,500 cps. as measured by a Brookfield Viscometer, Model RVT.

Table I shows the results of adding 28 g. of a 5% solution of this product to 350 g. of the drilling fluid described in Example I.

EXAMPLE III

A solution of 10 g. of a high molecular weight (D.P. 16,800) completely hydrolyzed polyvinyl alcohol and 25 g. of methyl acrylate in 927.5 ml. of water is purged with nitrogen for 30 minutes. This solution is heated to 70° C. Then 37.5 ml. of water containing dissolved therein 2.03 g. of ceric ammonium nitrate and 1.66 g. of nitric acid is added. The mixture is stirred for 3½ hours at 70° C. Then the mixture is cooled to room temperature and neutralized to about pH 10.8 by the addition of 23 ml. of 10% solution hydroxide. There is obtained a yield of 33.5 g. of a polymer of vinyl alcohol containing attached thereto, at intervals of about 62 vinyl alcohol units, side chains of poly(methyl acrylate) about 73 units long.

To this reaction mixture is added a solution of 10.7 g. of sodium hydroxide pellets in 15 ml. of water. The resulting mixture is heated for 19 hours at about 105° C. under a slight pressure of nitrogen. The excess sodium hydroxide is neutralized to a pH of about 8.4 by the addition of 5.2 ml. of 5.0 N sulfuric acid. The product is a solution having at a concentration of 5% a viscosity of 8,800 cps., as measured by a Brookfield Viscometer, Model RVT.

Table I shows the results of adding 28 g. of a 5% solution of this product to 350 g. of the drilling fluid described in Example I.

EXAMPLE IV

A solution of 10 g. of a high molecular weight (D.P. 16,800) completely hydrolyzed polyvinyl alcohol and 75 g. of methylacrylate in 877.5 ml. of water is purged with nitrogen for 30 minutes. This solution is heated to 40° C. Then 37.5 ml. of of water containing dissolved therein 2.03 g. of ceric ammonium nitrate and 1.66 g. of nitric acid is added. The mixture is stirred for 3 hours at 40° C. Then the mixture is cooled to room temperature and neutralized to about pH 7.5 by the addition of 17 ml. of 10% sodium hydroxide. There is obtained a yield of 80.8 g. of a polymer of vinyl alcohol containing attached thereto, at intervals of about 62 vinyl alcohol units, side chains of poly(methyl acrylate) about 220 units long.

To the reaction mixture is added a solution of 32.3 g. of sodium hydroxide pellets in 200 g. of water. The resulting mixture is heated for 17¾ hours at about 105° C. under a slight pressure of nitrogen. The excess sodium hydroxide is neutralized to a pH of about 7.7 by the addition of 11 ml. of 4.73 N sulfuric acid. The product is a solution having at a concentration of 5% a viscosity of 40,000 cps. as measured by a Brookfield Viscometer, Model RVT.

Table I shows the results of adding 28 g. of a 5% solution of this product to 350 g. of the drilling fluid described in Example I.

EXAMPLE V

A solution of 10 g. of a high molecular weight (D.P. 16,800) completely hydrolyzed polyvinyl alcohol and 100 g. of methyl acrylate in 852.5 ml. of water is purged with nitrogen for 30 minutes. This solution is heated to 60° C. Then 37.5 ml. of water containing dissolved therein 2.03 g. of ceric ammonium nitrate and 1.66 g. of nitric acid is added. The mixture is stirred for 4 hours at 60° C. Then the mixture is cooled to room temperature and neutralized to about pH 7.5 by the addition of 16 ml. of 10% sodium hydroxide. There is obtained a yield of 106 g. of a polymer of vinyl alcohol containing attached thereto, at intervals of about 62 vinyl alcohol units, side chains of poly(methyl acrylate) about 298 units long.

To this mixture is added a solution of 42.8 g. of sodium hydroxide pellets in 500 ml. of water. The resulting mixture is heated for 24 hours at about 105° C. under a slight pressure of nitrogen. The product is a solution having at a concentration of 5% a viscosity of 180,000 cps.

Table I shows the results of adding 28 g. of a 5% solution of this product to 350 g. of the drilling mud described in Example I.

EXAMPLE VI

A solution of 10 g. of a high molecular weight (D.P. 16,800) completely hydrolyzed polyvinyl alcohol and 25 g. of acrylonitrile in 952.5 ml. of water is purged with nitrogen for 30 minutes. Then 12.5 ml. of water containing dissolved therein 0.69 g. of ceric ammonium nitrate and 0.79 g. of nitric acid is added. The mixture is stirred for 2 hours at room temperature. Then it is neutralized to about pH 7.5 by the addition of 6 ml. of 10% sodium hydroxide and filtered to yield 9.2 g. of a polymer of vinyl alcohol containing attached thereto, at intervals of about 182 vinyl alcohol units, side chains of polyacrylonitrile about 34 units long.

The product is hydrolyzed with sodium hydroxide by heating for 47 hours at about 105° C. The resulting product is a solution having at a concentration of 5% a viscosity of 150,000 cps.

Table I shows the result of adding 28 g. of a 5% solution of this product to 350 g. of the drilling fluid described in Example I.

EXAMPLE VII

A solution of 10 g. of a high molecular weight (D.P. 16,800) completely hydrolyzed polyvinyl alcohol and 100 g. of acrylonitrile in 877.5 of water is purged with nitrogen for 30 minutes. This solution is heated to 40° C. Then 12.5 ml. of water containing dissolved therein 0.69 g. of ceric ammonium nitrate and 0.79 g. of nitric acid is added. The mixture is stirred for 2½ hours at 40° C. Then the mixture is cooled to room temperature and neutralized to about pH 7.5 and filtered to yield 82.8 g. of a polymer of vinyl alcohol containing attached thereto, at intervals of about 182 vinyl alcohol units, side chains of polyacrylonitrile about 1098 units long.

To this polymer is added 42.5 g. of sodium hydroxide pellets in 880 g. of water. The resulting mixture is heated for 45 hours at 105° C. under a slight pressure of nitrogen. The excess sodium hydroxide is neutralized to a pH of about 10.2 by the addition of 28 g. of 5.0 N sulfuric acid. The product is a solution having at a concentration of 5% a viscosity of 50,000 cps. It is an excellent thickener for both natural rubber and synthetic styrene-butadiene rubber latexes.

Table I shows the result of adding 28 g. of a 5% solution of this product to 350 g. of the drilling fluid described in Example I.

EXAMPLE VIII

A solution of 10 g. of a medium molecular weight (D.P. 11,300) partially hydrolyzed polyvinyl alcohol and 50 g. of acrylonitrile in 975 ml. of water is purged with nitrogen for 30 minutes. To this solution at 25° C. is added 25 ml. of water containing dissolved therein 1.37 g. of ceric ammonium nitrate and 1.57 of nitric acid. The mixture is stirred for 2 hours and then neutralized with 14.5 g. of 10% sodium hydroxide to a pH of about 8. There is obtained a yield of 41 g. of a polymer of vinyl alcohol containing attached thereto, at intervals of about 91 vinyl alcohol units, side chains of polyacrylonitrile about 234 units long.

To the reaction mixture is added a solution of 26.1 g. of sodium hydroxide pellets in 26 ml. of water. The resulting mixture is heated for 48 hours at about 105° C. under a slight pressure of nitrogen. The excess sodium hydroxide is neutralized to a pH of about 9.5 by the addition of dilute sulfuric acid. A highly viscous solution results. Its viscosity at a concentration of 5.0% is greater than 70,000 cps.

Table I shows the result of adding 28 g. of a 5% solution of this product to 350 g. of the drilling fluid described in Example I.

EXAMPLE IX

By a procedure similar to that used in Example VIII, acrylonitrile is graft polymerized onto a high molecular weight (D.P. 16,800) almost completely hydrolyzed polyvinyl alcohol to obtain a polymer of vinyl alcohol containing attached thereto, at intervals of about 91 vinyl alcohol units, side chains of polyacrylonitrile about 264 units long.

A dispersion of 45.1 g. of this polymer in 1000 g. of water containing dissolved therein 28.6 g. of sodium hydroxide is heated for 45 hours at about 105° C. Then the solution is neutralized to a pH of about 10.0 by the addition of 12.6 ml. of 4.86 N sulfuric acid. The product is a solution having at a concentration of 5% a viscosity of 39,000 cps.

Table I shows the result of adding 28 g. of a 5% solution of this product to 350 g. of the drilling fluid described in Example I.

EXAMPLE X

By a procedure similar to that used in Example VIII, acrylonitrile is graft polymerized onto a high molecular weight (D.P. 11,100) partially hydrolyzed (88%) polyvinyl alcohol to obtain a polymer of vinyl alcohol containing attached thereto, at intervals of about 91 vinyl alcohol units, side chains of polyacrylonitrile about 268 units long.

A dispersion of 45.7 of this polymer in 1000 g. of water containing dissolved therein 28.6 g. of sodium hydroxide is heated for 48 hours at about 105° C. under a slight pressure of nitrogen. The product is neutralized to a pH of about 9.6 by the addition of 11.6 ml. of 4.86 N sulfuric acid. The product is a solution having at a concentration of 5% a viscosity of 2,000 cps.

Table I shows the result of adding 28 g. of a 5% solution of this product to 350 g. of the drilling fluid described in Example I.

EXAMPLE XI

By a procedure similar to that used in Example VIII, acrylonitrile is graft polymerized onto a high molecular weight (D.P. 16,800) completely hydrolyzed polyvinyl alcohol to obtain a polymer of vinyl alcohol containing attached thereto, at intervals of about 91 units, side chains of polyacrylonitrile about 284 units long.

A dispersion of 47.6 g. of this polymer in 1000 g. of water containing dissolved therein 28.1 g. of sodium hydroxide is heated for 47 hours at about 105° C. under a slight pressure of nitrogen. The product is neutralized to a pH of about 10.0 by the addition of 31 ml. of 4.73 N sulfuric acid. The product is a solution having at a concentration of 5% a viscosity of 2600 cps.

Table I shows the result of adding 28 g. of a 5% solution of the product to 350 g. of the drilling fluid described in Example I.

EXAMPLE XII

By a procedure similar to that used in Example VIII, acrylonitrile is graft polymerized onto a low molecular weight (D.P. 812) completely hydrolyzed polyvinyl alcohol to obtain a polymer of vinyl alcohol containing attached thereto, at intervals of about 91 vinyl alcohol units, side chains of polyacrylonitrile about 306 units long.

A dispersion of 50.6 g. of this polymer in 1000 ml. of water containing dissolved therein 28.6 g. of sodium hydroxide is heated for 46 hours at about 105° C. under a slight pressure of nitrogen. The product is neutralized to a pH of about 9.1 by the addition of 11.4 ml. of 4.86 N sulfuric acid. The product is a solution having at a concentration of 5% a viscosity of 200 cps.

Table I shows the result of adding 28 g. of a 5% solution of this product to 350 g. of the drilling fluid described in Example I.

EXAMPLE XIII

The procedure of Example I may be carried out using potassium hydroxide instead of sodium hydroxide to provide potassium salts of the polymers.

EXAMPLE XIV

The procedure of Example I may be carried out using N,N-dimethyl ammonium hydroxide in place of sodium hydroxide to provide N,N-dimethyl ammonium esters of the polymers.

EXAMPLE XV

The procedure of Example I may be carried out using N,N,N,N-tetrabutyl ammonium hydroxide in place of sodium hydroxide to provide N,N,N,N-tetraammonium esters of the polymers.

*Table I*

| Example No. | Lb./bbl. | Formula I/II | Formula n | Fluid Loss, ml. Before Heating | Fluid Loss, ml. After Heating | Mud Viscosity, cps. Before Heating | Mud Viscosity, cps. After Heating |
|---|---|---|---|---|---|---|---|
| Control | 0 | | | 48 | 23 | 6.0 | 6.0 |
| I | 1.4 | 91:1 | 105 | 7.3 | 9.6 | 18 | 13 |
| II | 1.4 | 36:1 | 115 | 8.2 | 9.0 | 428 | 32 |
| III | 1.4 | 62:1 | 73 | 8.3 | 14.8 | 11 | 25 |
| IV | 1.4 | 62:1 | 220 | 8.0 | 9.0 | 620 | 62 |
| V | 1.4 | 62:1 | 298 | 6.7 | 7.6 | 1,010 | 150 |
| VI | 1.4 | 182:1 | 34 | 8.2 | 15 | 43 | 10 |
| VII | 1.4 | 182:1 | 1,098 | 7.4 | 10.5 | 240 | 30 |
| VIII | 1.4 | 91:1 | 234 | 6.5 | 9.0 | 33 | 28 |
| IX | 1.4 | 91:1 | 264 | 7.2 | 11 | 38 | 10 |
| X | 1.4 | 91:1 | 268 | 7.2 | 9.8 | 26 | 14 |
| XI | 1.4 | 91:1 | 284 | 8.1 | 17.7 | 15 | 28 |
| XII | 1.4 | 91:1 | 306 | 8.0 | 12.0 | 600 | |

What is claimed is:

1. An improved aqueous drilling fluid comprising water, particulate solid material which forms a filter cake on the wall of a well, and a water-soluble graft polymer comprising a linear chain of vinyl alcohol units of the formula:

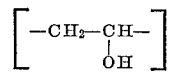

I and reoccurring units of the formula:

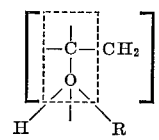

II in which R is the side chain graft polymerized onto said linear chain and is a radical having the formula

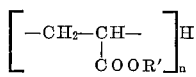
III wherein R' is selected from the group consisting of Na, K, Li, NH$_4$, R''NH$_3$, R''$_2$NH$_2$, R''$_3$NH and R''$_4$N, and R'' is an alkyl group containing from 1 to 4 carbon atoms; $n$ is a positive integer from 25 to 1200, the ratio of the number of vinyl alcohol groups of Formula I to the number of groups of Formula II is in the range between 30:1 and 200:1, and the total number of vinyl alcohol groups of Formula I is in the range between 800 and 20,000; said polymer being present in an amount sufficient to reduce water loss through the filter cake without increasing the viscosity of said drilling fluid to prevent circulation thereof at elevated temperatures on the order of 350° F.

2. An aqueous drilling fluid according to claim 1 wherein the water-soluble polymer is one in which $n$ is a positive integer from 100 to 300, and the ratio of the number of vinyl alcohol groups of Formula I to the number of groups of Formula II is in the range between 100 and 200.

3. An aqueous drilling fluid according to claim 1 wherein the water-soluble polymer is one in which R' is sodium.

4. An aqueous drilling fluid according to claim 2 wherein the water-soluble polymer is one in which R' is sodium.

5. An aqueous drilling fluid according to claim 1 comprising from about 0.1 to about 5 pounds of water-soluble polymer per barrel of drilling fluid.

6. An aqueous drilling fluid according to claim 4 comprising from about 0.1 to about 5 pounds of water-soluble polymer per barrel.

7. In a process for drilling a well with well-drilling tools wherein an aqueous drilling fluid containing particulate solid material is circulated through the well, the method of forming a filter cake on the wall of the well to reduce water loss which comprises adding to said drilling fluid in an amount which does not increase the viscosity of said drilling fluid to prevent its circulation, a water-soluble graft polymer comprising a linear chain of vinyl alcohol units of the formula:

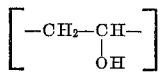
I and reoccurring units of the formula:

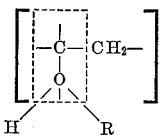
II in which R is the side chain graft polymerized onto said linear chain and is a radical having the formula

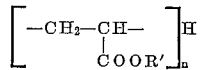
III wherein R' is selected from the group consisting of Na, K, Li, NH$_4$, R''NH$_3$, R''$_2$NH$_2$, R''$_3$NH and R''$_4$N, and R'' is an alkyl group containing from 1 to 4 carbon atoms; $n$ is a positive integer from 25 to 1200; the ratio of the number of vinyl alcohol groups of Formula I to the number of groups of Formula II is in the range between 30:1 and 200:1, and the total number of vinyl alcohol groups of Formula I is in the range between 800 and 20,000 and contacting said wall of said well with said drilling fluid.

8. The method according to claim 7 wherein the water-soluble polymer is one in which $n$ is a positive integer from 100 to 300, and the ratio of the number of vinyl alcohol groups of Formula I to the number of groups of Formula II is in the range between 100 and 200.

9. The method according to claim 7 wherein the water-soluble polymer is one in which R' is sodium.

10. The method according to claim 8 wherein the water-soluble polymer is one in which R' is sodium.

11. The method according to claim 10 in which said water-soluble polymer is added in an amount providing from about 0.1 to about 5 pounds per barrel of drilling fluid.

References Cited by the Examiner
UNITED STATES PATENTS

| | | |
|---|---|---|
| 2,718,497 | 9/1955 | Oldham et al. |
| 3,072,569 | 1/1963 | Siegele. |
| 3,083,172 | 3/1963 | Scott et al. |

OTHER REFERENCES

Metz, Graft Copolymers—A New Technology, Article in Nucleonics, vol. 16, No. 4, April 1958, pages 73 to 77, 260–875.

LEON D. ROSDOL, *Primary Examiner.*

JULIUS GREENWALD, *Examiner.*

H. B. GUYNN, *Assistant Examiner.*